United States Patent

Mahlein et al.

[11] 4,097,126
[45] Jun. 27, 1978

[54] OPTICAL LAYER DEVICE WITH REFLECTING SURFACE ON COLLODION FOIL

[75] Inventors: Hans Mahlein; Walter Rauscher, both of Munich, Germany

[73] Assignee: Siemens Aktiengesellschaft, Berlin & Munich, Germany

[21] Appl. No.: 689,924

[22] Filed: May 25, 1976

[30] Foreign Application Priority Data

Jun. 10, 1975 Germany .............................. 2525863

[51] Int. Cl.² .......................... G02B 5/10; G02B 1/10
[52] U.S. Cl. ................................... 350/295; 350/164
[58] Field of Search ..................... 350/295, 310, 164

[56] References Cited

U.S. PATENT DOCUMENTS

| | | | |
|---|---|---|---|
| 2,552,184 | 5/1951 | Koch | 350/164 |
| 3,387,494 | 6/1968 | Golay | 350/295 |
| 3,514,776 | 5/1970 | Mulready | 350/295 |
| 3,936,159 | 2/1976 | Pavenick | 350/310 |

FOREIGN PATENT DOCUMENTS 380,473  9/1932  United Kingdom ................ 350/295

Primary Examiner—Jon W. Henry
Attorney, Agent, or Firm—Hill, Gross, Simpson, Van Santen, Steadman, Chiara & Simpson

[57] ABSTRACT

An optical layer device having a substrate with a surface having one or more layers of either dielectric or metallic materials provided thereon characterized by the substrate being mounted on a holder and being of an elastically deformable material and means for deforming the substrate so that the substrate may be deformed in a predetermined spherical or aspherical fashion. Depending on the construction of the layers, the device may be utilized as either a variable reflector or a variable interference filter. In one embodiment of the invention, the deforming of the substrate is accomplished by varying a pneumatic pressure in the chamber which pressure contacts one surface of the substrate. In another embodiment of the invention, the deforming is accomplished by selectively heating the holder and substrate so that a predetermined deformation is caused by the different rate of thermal expansion for the holder and substrate.

1 Claim, 2 Drawing Figures

OPTICAL LAYER DEVICE WITH REFLECTING SURFACE ON COLLODION FOIL

BACKGROUND OF THE INVENTION

1. Field of the Invention

The present invention is directed to an optical layer device with one or more dielectric and/or metallic layers disposed on a surface of a substrate.

2. Prior Art

It is known to use an optical layer device as an interference filter in which the wavelengths, that are not transmitted, are removed by interference phenomena. The use of an optical layer device as a reflector with a predetermined reflection coefficient and radius of curvature is also well known. To produce an optical layer device, that is a reflector, a plurality of layers of dielectric material are deposited on a substrate with the layers having alternately high and low index of refractions. The optical thickness of each layer for the wavelength of the light being reflected is one-fourth of the wavelength so that the portion of light reflected at each of the interfaces between the layers are all in phase. When making an optical interference filter, the layers of a material, such as a dielectric material, are deposited on a transparent substrate with alternate layers having a high and low index of refraction. If two-quarter-wave layer systems are separated by a layer which has an optical thickness for the wavelength of the light to be transmitted therethrough of an integral number of half wavelengths, a pass band will exist.

In both examples, the substrate consists of a solid member such as glass, and the characteristics of the image properties or the filter properties of the layer system have a constant magnitude on account of the fixed configuration of the surface of the substrate which configuration may be either planar or curved with a predetermined curvature.

SUMMARY OF THE INVENTION

The present invention is directed to providing an optical layer device which permits an adaptation of the reflection or filter properties of the optical layer to a beam of light striking the optical layer device. Thus, the present invention is intended to provide an optical layer device which functions as a variable reflector or a variable filter.

To accomplish this task an optical layer device of the present invention comprises a substrate having a surface with at least one layer of material provided thereon, said material being selected from a group consisting of a dielectric and metallic materials and has the improvements comprising said substrate being mounted on the holder, said substrate being of an elastic deformable material and means for deforming the substrate so that the substrate may be deformed in a predetermind spherical or asphereical fashion.

The characteristics of the image property and particularly the curvature and focal distance of the layer of optical layer device of the present invention, which device has been constructed as a reflector, are thus capable of being varied within wide limits. These reflectors or mirrors may be employed for adjustable optical lighting arrangements and in a tunable laser resonator.

In constructing a layer device as a filter, the curvature of the individual layers may be adapted to either convergent or divergent beams so that the spectral width of the pass band is not increased and so that the transmission curve is not reduced and spectroscopically shifted. A reflector or filter of the device of the present invention may be reduced to predetermined dimensions by means of simple cutting to size and bonding it with other optical component elements by means of a transparent optical cement. The property of a deformable substrate is also of interest in the fabrication of integrated optical component elements.

The maximum possible change in the curvature of a reflector or filter is dependent upon the elasticity of the layers used which layers have been previously deposited by evaporation.

In order to variably deform the optical layer device between a concave and convex form, a substrate having a planar construction is advantageously used. However, if the curvature of either the reflector or filter is to be large, it is desirable to use an arrangement with a substrate which had either been constructed or formed with a corresponding curvature prior to applying the layer thereon.

As a substrate, it is advantageous to use an elastic synthetic or plastic foil or a collodion foil. The means for deforming the substrate may comprise a pneumatic chamber adjacent one surface of the substrate and means for applying a pneumatic pressure therein which acts on one surface to cause deforming of the substrate.

The means for deforming the substrate may also be the provision of means for heating the holder and substrate which, due to the different rate of thermal expansion, will cause a deformation of the substrate.

DESCRIPTION OF THE PREFERRED EMBODIMENT

Figure 1:
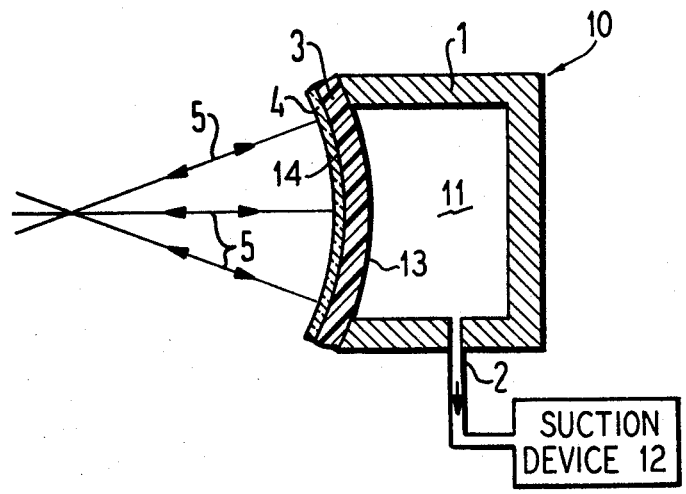
FIG. 1 is a cross-sectional view of a pneumatically operated variable reflector in accordance with the present invention.

The principles of the present invention are particularly useful when incorporated in an optical layer device generally indicated at 10 in FIG. 1. The optical layer device 10 includes a holder 1 having a hollow configuration to form a chamber 11 that has an outlet 2 extending to means for pneumatically varying the pressure in chamber 11 which means is illustrated as a suction device 12. A thin collodion foil 3 is peripherally sealed in an air tight manner on a periphery of the holder 1 so that one surface 13 closes off the chamber 11. As illustrated, the foil 3 has been formed with a predetermined concave curvature.

On the outer surface 14 of the foil 3, a layer system 4 is present. The layer system 4 was formed by evaporating one or more layers of material onto the substrate 3. When the suction device 12 applies a predetermined low pressure in the chamber 11, the substrate 3 and the layer system 4 will be deformed into a concave shape which may be either spherical or aspherical and has a predetermined radius of curvature. The predetermined curvature may exhibit a dimension of such a type that all partial beams 5 of a random, divergent beam of light perpendicularly strikes the layer system 4 and are reflected back on themselves as illustrated.

The radius of curvature of the layer stream 4 may be altered by deforming the substrate 3 so that the beams of light are reflected at either a predetermined divergent or convergent angle.

The substrate 3 may be a collodion foil which was produced by means of drying a collodion-ether solution on a glass plate. The dried collodion foil is subsequently separated from the glass plate by peeling. If the substrate is to have a planar configuration while in a nondeformed state, the foil is formed by drying the collodion-ether solution on a planar surface of the glass plate. However, if the substrate 3 has a predetermined radius of curvatures while in the undeformed state, the solution is applied on a curved surface of a glass plate which curved surface may be either a spherical or aspherical surface with the desired amount of curvature. In either situation, the collodion foil subsequent to removal from the glass plate, will exhibit good surface properties and may be easily deformed in either an aspherical or a spherical fashion.

In the embodiment illustrated in FIG. 1, the substrate 3 may be a collodion foil having a diameter of several centimeters and a thickness in the range of between 0.05 and 0.2 mm. The layer system 4 is formed by vapor depositing multiple layers of a dielectric material. For example, alternately depositing layers of ZnS and $MgF_2$ while the substrate is in a high-vacuum vapor-deposition device.

From experiments, it has been shown that a cylindrical deformation of an initially planar or flat substrate to a radius of curvature up to 25 mm may be obtained without damaging the layers which have been deposited by evaporation. If the vapor deposited collodion foil with the vapor deposited layers is pressed onto a spherical metal area by means of a circular rubber ring engaging the periphery of the foil, spherical deformation having a radius of curvature of up to 50 mm may be obtained without damaging the layers. If the foil was produced by means of drying on a curved carrier having a curved surface of a defined precurvature, smaller radii of curvatures may be obtained without damaging the foil.

After forming the foil on the carrier, the layers of system 4 are vapor deposited on the foil and then the foil with the deposited layers is removed from the carrier. By producing a foil with a layer system 4 that has a curvature in an undeformed state, the device may be deformed without damage to the layer to increase or reduce the amount of curvature.

With the substrate 3, such as a planar or flat surface with the layer system 4 disposed on the hollow-shaped holder 1, the layer system 4 may be convexly or concavely deformed in a pneumatic fashion. For example by either applying a predetermined positive air pressure in the cavity 11 the surface of the layer system will be convexly deformed and by applying a low air pressure in the cavity 11, the surface of the layer system can be concavely deformed into a desired radius of curvature.

Figure 2:
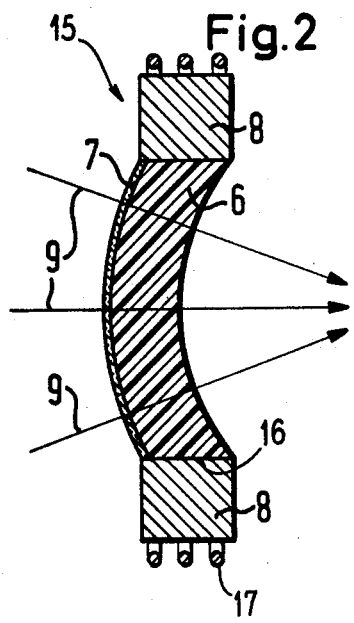
FIG. 2 is a cross-sectional view of a thermally operated variable filter in accordance with the present invention.

An embodiment of the optical layer device is generally indicated at 15 in FIG. 2. In the device 15, an optical layer system 7 which is formed by one or more layers is disposed on a surface of a synthetic lens 6. The lens 6, which is illustrated as a convexoconcave lens, has a cylindrical periphery 16 which is mounted in a metallic ring 8 which may be inductively heated by a coil 17. Due to the conduction of heat from the ring 8 to the lens 6, the lens is also heated. Thus, due to different rate of thermal expansion for the ring 8 and the lens 6, the lens 6 will be deformed in a predetermined fashion. The deforming of the lens 6 will change the surface curvature of the lens in a predetermined fashion depending on the temperature which is present therein. For example, if the thermal coefficient of expansion for the ring 8 is greater than that of the material of forming the lens 6, the diameter of the support ring 8 will increase by a greater amount than the diameter of the lens 6 so that a stretching is applied to the lens to increase the radius of curvature of the surface of the lens. In a similar manner, if the lens 6 is composed of a material having a higher rate of thermal expansion than the ring 8, the deforming will cause a decrease in the radius of curvature of each of the curved surfaces of the lens.

As illustrated, the convergent partial beams 9 of a covergent beam of light are directed through the lens 6 and strike the layer system 7 in a perpendicular fashion. If the layer system 7 is constructed as a spectroscopic filter, each of the partial beams 9 after passing through the filter will exhibit the same fraction of the spectrum of the incident beam.

The elastic synthetic lens 6, which may have a thickness in the range of 0.05 mm to 0.2 mm, may be formed of the same type of material as plastic contact lenses (e.g. polymerized 2-hydroxyethylmethacrylate) which are used in opthalmology and such a material is well suited for the substrate. Furthermore, production of the lens 6 may be made by a simple method of production which is used in making contact lenses.

Although various minor modifications may be suggested by those versed in the art, it should be understood that we wish to employ within the scope of the patent warranted hereon, all such modifications as reasonably and properly come within the scope of our contribution to the art.

We claim:

1. An optical layer device for use as a mirror in a tunable laser comprising a holder, a substrate of an elastic deformable material having a surface of a predetermined curvature in an undeformed condition, said substrate being a collodion foil having a thickness in the range of between 0.05 and 0.2 mm, said surface being provided with a reflecting surface layer comprising at least one layer of material selected from a group consisting of dielectric and metallic materials, said substrate having a periphery sealed to said holder to mount the substrate thereon, and means for selectively deforming the substrate to change the predetermined curvature of said surface in a predetermined spherical or aspherical fashion so that the optical layer device functions as a variable reflector.

* * * * *